(12) United States Patent
Liu et al.

(10) Patent No.: US 9,854,196 B2
(45) Date of Patent: Dec. 26, 2017

(54) HEAD-MOUNTED ELECTRONIC DEVICE AND AUDIO PROCESSING METHOD

(71) Applicants: Beijing Lenovo Software Ltd., Haidian District, Beijing (CN); Lenovo (Beijing) Co., Ltd., Beijing (CN)

(72) Inventors: Junfeng Liu, Beijing (CN); Yunfeng Pan, Beijing (CN); Fei Wu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 867 days.

(21) Appl. No.: 14/091,614

(22) Filed: Nov. 27, 2013

(65) Prior Publication Data

US 2014/0146243 A1 May 29, 2014

(30) Foreign Application Priority Data

Nov. 28, 2012 (CN) .......................... 2012 1 0496453
Feb. 1, 2013 (CN) .......................... 2013 1 0042793

(51) Int. Cl.
*H04N 5/60* (2006.01)
*G02B 27/01* (2006.01)
(Continued)

(52) U.S. Cl.
CPC ............. *H04N 5/60* (2013.01); *G02B 27/017* (2013.01); *G02B 27/0176* (2013.01);
(Continued)

(58) Field of Classification Search
CPC ........................................................ H04N 5/60
(Continued)

(56) References Cited

U.S. PATENT DOCUMENTS 6,788,620 B2   9/2004   Shiraishi
7,389,569 B2   6/2008   Shiraishi
(Continued)

FOREIGN PATENT DOCUMENTS

CN   1458808      11/2003
CN   201035260    3/2008
(Continued)

OTHER PUBLICATIONS

Second Office Action dated May 12, 2016 out of Chinese priority Application No. 201210496453.9 (23 pages including English translation).

(Continued)

*Primary Examiner* — Yulin Sun
(74) *Attorney, Agent, or Firm* — Brinks Gilson & Lione

(57) ABSTRACT

A head-mounted electronic device and an audio processing method includes a fixing unit, by which the head-mounted electronic device can be worn on the wearer's head; a processing unit, provided in the fixing unit and configured to perform audio processing and output a first audio signal; a first bone conduction unit, provided on the inner side of the fixing unit, configured to generate vibrations according to the first audio signal, so that the wearer can hear the first audio through the generated vibration, wherein the inner side of the fixing unit is the side which is closer to the wearer's head when the head-mounted electronic device is worn on the wearer's head, and when the head-mounted electronic device is worn on the wearer's head, the first bone conduction unit contacts the wearer's head, so wearer can sense vibrations generated by the first bone conduction unit.

8 Claims, 15 Drawing Sheets

(51) Int. Cl.
*H04R 5/033* (2006.01)
*H04R 1/10* (2006.01)
*H04N 21/41* (2011.01)
*H04N 21/4363* (2011.01)
*H04N 21/439* (2011.01)

(52) U.S. Cl.
CPC ..... *H04N 21/4122* (2013.01); *H04N 21/4126* (2013.01); *H04N 21/439* (2013.01); *H04N 21/43637* (2013.01); *H04R 1/1066* (2013.01); *H04R 5/0335* (2013.01); *H04R 2460/13* (2013.01)

(58) Field of Classification Search
USPC .......................................................... 348/38
See application file for complete search history.

(56) References Cited

U.S. PATENT DOCUMENTS

| | | | |
|---|---|---|---|
| 8,520,869 B2 | 8/2013 | Fujise | |
| 8,576,491 B2 | 11/2013 | Takagi | |
| 8,593,795 B1* | 11/2013 | Chi | G02C 1/023 312/334.46 |
| 2003/0231549 A1 | 12/2003 | Shiraishi | |
| 2004/0144181 A1 | 7/2004 | Shiraishi | |
| 2005/0275714 A1 | 12/2005 | Ishikawa | |
| 2011/0032077 A1* | 2/2011 | Setlak | G06K 9/0002 340/5.83 |
| 2011/0213664 A1 | 9/2011 | Osterhout | |
| 2012/0099746 A1 | 4/2012 | Fujise | |
| 2012/0200936 A1 | 8/2012 | Takagi | |
| 2013/0329918 A1* | 12/2013 | Kubba | G02B 27/017 381/151 |
| 2014/0064536 A1* | 3/2014 | Kim | G02B 27/017 381/333 |

FOREIGN PATENT DOCUMENTS

| | | |
|---|---|---|
| CN | 102450035 | 5/2012 |
| CN | 102628993 | 8/2012 |
| CN | 202975477 U | 6/2013 |
| DE | 202012003317 U1 | 7/2012 |

OTHER PUBLICATIONS

First Office Action dated Sep. 2, 2015 out of corresponding Chinese Patent Application No. 201210496453.9 (20 pages including English translation).

Article, Jiang et al., "*Study on Piezoelectric Bone Conduction Hearing Equipment With Rectangle Structure*", Machinery Design & Manufacture, Aug. 31, 2012, pp. 104-106.

First Office Action dated Oct. 27, 2016 (20 pages including English translation) out of Chinese priority Application No. 201310042793.9.

Second Office Action dated Apr. 24, 2017 (20 pages including English translation) out of Chinese priority Application No. 201310042793.9.

* cited by examiner

HEAD-MOUNTED ELECTRONIC DEVICE AND AUDIO PROCESSING METHOD

BACKGROUND

This application claims priority to Chinese patent application No. 201210496453.9 filed on Nov. 28, 2012, and to Chinese patent application No. 201310042793.9 filed on Feb. 1, 2013, the entire contents of which are incorporated herein by reference.

The present disclosure relates to a head-mounted electronic device and an audio processing method.

With the development of communication technology, a variety of portable electronic devices, such as tablet computers, smart phones, game consoles and portable media players. However, when the wearer uses the current portable electronic device, it is often required to hold the electronic device in hand and keep a certain posture so as to operate the electronic device or watch the content shown by the electronic device. This makes the wearer unable to perform other operations when operating the electronic device. Moreover, after operating for a period of time, the wearer will feel the hands, shoulders, neck or other parts tired.

Therefore, it is desired to provide a new portable electronic device to free the wearer's hands, changing the wearer's operating posture, and reducing the space occupied while giving the wearer better experiences.

SUMMARY

The object of the present embodiment of the disclosure is to provide a head-mounted electronic device and an audio processing method to solve the above problems.

An embodiment of the present disclosure provides a head-mounted electronic device, comprising: a fixing unit, by which the head-mounted electronic device can be worn on the wearer's head; a processing unit, provided in the fixing unit and configured to perform audio processing and output a first audio signal; a first bone conduction unit, provided on the inner side of the fixing unit, configured to generate vibrations according to the first audio signal, so that the wearer can hear the first audio through the generated vibration, wherein the inner side of the fixing unit is the side closer to the head of wearer when the head-mounted electronic device is worn on the wearer's head. And when the head-mounted electronic device 100 is worn on the wearer's head, the first bone conduction unit contacts the wearer's head, so that the wearer can sense vibrations generated by the first bone conduction unit.

Another embodiment of the present disclosure also provides an audio processing method, used in a head-mounted electronic device, wherein the head-mounted electronic device comprises: a fixing unit, by which the head-mounted electronic device can be worn on the wearer's head; a first bone conduction unit, provided on the inner side of the fixing unit, wherein the inner side of the fixing unit is the side closer to the wearer's head when the head-mounted electronic device is worn on the wearer's head. And when the head-mounted electronic device is worn on the wearer's head, the first bone conduction unit contacts the wearer's head. The method comprises: processing the audio file and outputting the first audio signal; receiving the first audio signal output by the processing unit through the first bone conduction unit; generating vibrations according to the first audio signal through the first bone conduction unit so as to enable the wearer to hear the first audio through the generated vibration.

In the head-mounted electronic device and the audio processing method according to the embodiment of the present disclosure, the wearer can hear the audio through the bone conduction unit on the inner side of the head-mounted electronic device, which improves the quality of the audio output. Moreover, since it is unnecessary to set a conventional audio playing unit, such as a headphone, a speaker and so on, in the head-mounted electronic device, the space occupied by the head-mounted electronic device is reduced while preventing other people from knowing the content that the wearer is hearing.

BRIEF DESCRIPTION OF THE DRAWINGS

For explaining technical solutions of the embodiments of the present disclosure, drawings to be used in the description of the embodiments of the present disclosure are described in brief.

DETAILED DESCRIPTION

Hereinafter, embodiments of the present disclosure will be described in detail with reference to the accompanying drawings. It should be noted that in the specification and the drawings, the same steps and elements are substantially represented with the same reference numbers, repeated explanation of those steps and elements will be omitted.

Figure 1:
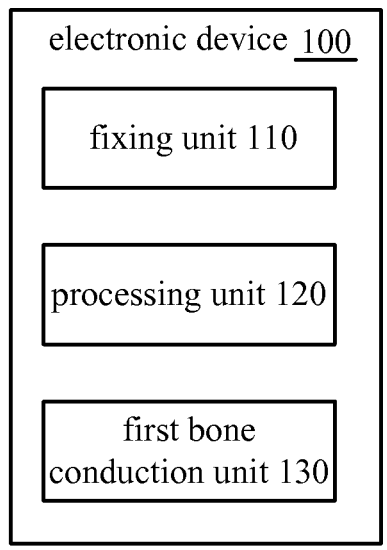
FIG. 1 illustrates an exemplary block diagram of a head-mounted electronic device according to the an embodiment of the present disclosure.

Next, a head-mounted electronic device of the embodiment of the present disclosure will be illustrated with reference to FIG. 1. FIG. 1 illustrates an exemplary block diagram of a head-mounted electronic device 100 according to the embodiment of the present disclosure. As shown in FIG. 1, the head-mounted electronic device 100 includes a fixing unit 110, a processing unit 120 and a first bone conduction unit 130.

The head-mounted electronic device 100 can be worn on the wearer's head via the fixing unit 110. For example, the fixing unit 110 may include wearing components such as helmets and headbands. Alternatively, the fixing unit 110 may further include supporting arms that can support the device on the wearer's ears. The processing unit 120 is provided in the fixing unit. The processing unit 120 can perform audio processes and output a first audio signal. For example, the audio files can be pre-stored in the head-mounted electronic device 100. The processing unit 120 can acquire the stored audio files, perform playing operation to the files in order to output the first audio signal. For another example, the head-mounted electronic device 100 may further include a transmitting/receiving unit to receive the audio files sent from another electronic device. The processing unit 120 can acquire the received audio files, and perform playing operation to the files in order to output the first audio signal.

The first bone conduction unit 130 can be provided at the inner side of the fixing unit 110. In the example of the present disclosure, the inner side of the fixing unit 110 is the side closer to the wearer's head when the head-mounted electronic device is worn on the wearer's head. The first bone conduction unit 130 can generate vibrations according to the first audio signal from the processing unit 120 so that the wearer can hear the first audio through the vibrations generated. Specifically, when the head-mounted electronic device 100 is worn on the wearer's head, the first bone conduction unit 130 contacts the wearer's head, so that the wearer can sense vibrations generated by the first bone conduction unit 130.

According to an example of the present disclosure, the first bone conduction unit 130 can directly receive the first audio signal from the processing unit 120 and generate vibrations according to the first audio signal. Alternatively, according to another example of the present disclosure, the head-mounted electronic device 100 may further include a power amplification unit provided in the fixing unit 120. The power amplification unit can receive a first audio signal from the processing unit 120 and amplify the first audio signal, wherein the amplified first audio signal is an AC (alternating current) voltage signal. The power amplification unit can apply the amplified first audio signal to the first bone conduction unit 130. The first bone conduction unit 130 can be driven by the amplified first audio signal so as to generate vibrations.

Figure 2:
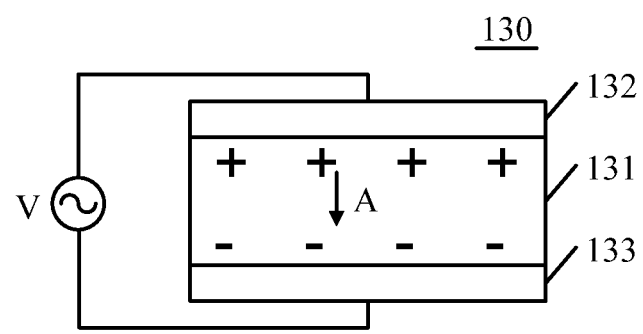
FIG. 2 is a diagram illustrating a first bone conduction unit according to an example of the present disclosure.

FIG. 2 is a diagram illustrating a first bone conduction unit according to an example of the present disclosure. As shown in FIG. 2, in an example of the present disclosure, the first bone conduction unit 130 may include a piezoelectric plate 131, a metal substrate 132 provided on the upper layer of the piezoelectric plate 131 and provided correspondingly to the piezoelectric plate 131 and a metal substrate 133 provided on the lower layer of the piezoelectric plate 131 and provided correspondingly to the piezoelectric plate 131. For example, the piezoelectric plate 131 can be a ceramic plate. The piezoelectric plate can be polarized previously so that, as shown by the arrow A in FIG. 2, a predetermined electric field can be formed inside the piezoelectric plate. When an AC voltage V from the power amplification unit is applied to the metal substrate, the piezoelectric plate and the metal substrate are bent by the force of the AC voltage so that vibrations can be generated according to the first audio signal.

Figure 3A:
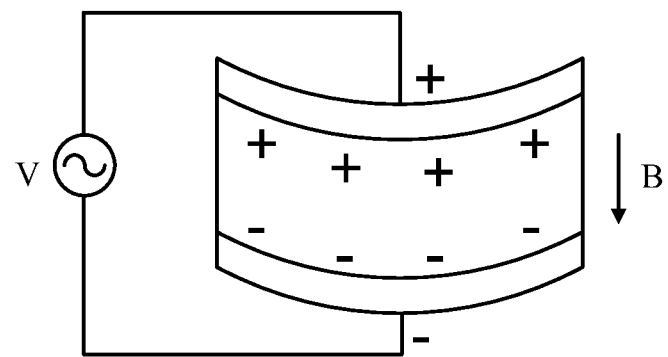
FIGS. 3a and 3b illustrate the a case in which the first bone conduction unit is bent by the action of the AC voltage according to an example of the present disclosure.
Figure 3B:
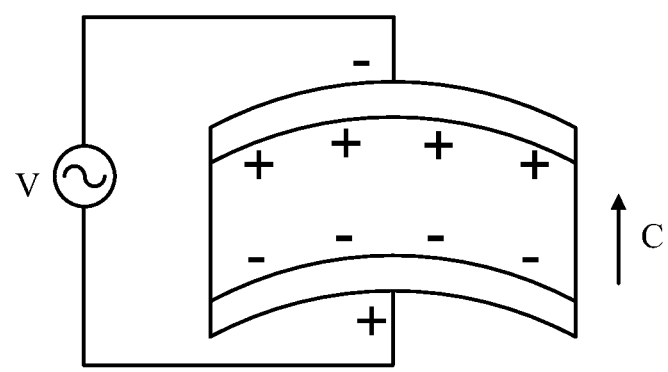

FIGS. 3a and 3b illustrate a schematic case wherein the first bone conduction unit 130 is bent by the force of the AC voltage according to an example of the present disclosure. As shown in FIG. 3a, when the direction of electric field formed by the AC voltage from the power amplification unit is the same with the direction of the predetermined electric field formed inside the piezoelectric plate, the piezoelectric plate in the first bone conduction unit 130 and the metal substrate will bend towards the direction shown by arrow B. When the direction the electric field formed by the AC voltage from the power amplification unit is opposite to the direction of the predetermined electric field formed inside the piezoelectric plate, the piezoelectric plate in the first bone conduction unit 130 and the metal substrate will bend towards the direction shown by arrow C. That is, the first bone conduction unit 130 bends quickly according to the first audio signal output from the processing unit 120 so as to generate vibrations.

According to an embodiment of the present disclosure, the length and thickness of the piezoelectric plate can be set according to the deformation displacement amount of the first bone conduction unit when the AC voltage is applied to the first bone conduction unit 130. The larger the required displacement amount is, the longer the piezoelectric plate can be set and the thinner it can be set. Further, the larger the required displacement amount is, the larger the magnification ratio of the power amplification unit can be set.

Further, according to another example of the present disclosure, the first bone conduction unit may further include an insulating flexible protective layer, such as a silica gel protective layer and so on, covering the upper side of the metal substrate. When the head-mounted electronic device is worn on the wearer's head, the wearer's head contacts the insulating flexible protective layer.

Moreover, FIG. 2 illustrates a diagram of single crystal bone conduction unit including a piezoelectric plate and a metal substrate. However, the present disclosure is not limited thereto, according to another example of the present disclosure, twin crystal or polycrystalline bone conduction units including more than two piezoelectric plates and metal substrates corresponding to each piezoelectric plate respectively can also be used.

In the embodiment shown in FIG. 2, the bone conduction unit based on the piezoelectric plate and the metal substrate is described as an example. However, the present disclosure is not limited thereto. According to another example of the present disclosure, the first bone conduction unit 130 may include a voice coil, a magnet and a vibrating diaphragm. The first audio signal from the processing unit 120 can be directly provided to the voice coil. Alternatively, as described above, the head-mounted electronic device 100 may further include a power amplification unit provided in the fixing unit 120. The power amplification unit can receive the first audio signal from the processing unit 120 and amplifies the first audio signal. In this example, the amplified first audio signal is an AC signal. The power amplification unit can apply the amplified audio signal to the voice coil of the first bone conduction unit 130. When the audio signal passes through the voice coil in the magnetic field generated by the magnet, a magnetic field varying with the audio current variation is generated. The varying magnetic field interacts with the magnetic field generated by the magnet and generates driving forces so, causing the voice coil and the vibrating diaphragm connected to the voice coil to vibrate.

Figure 16:
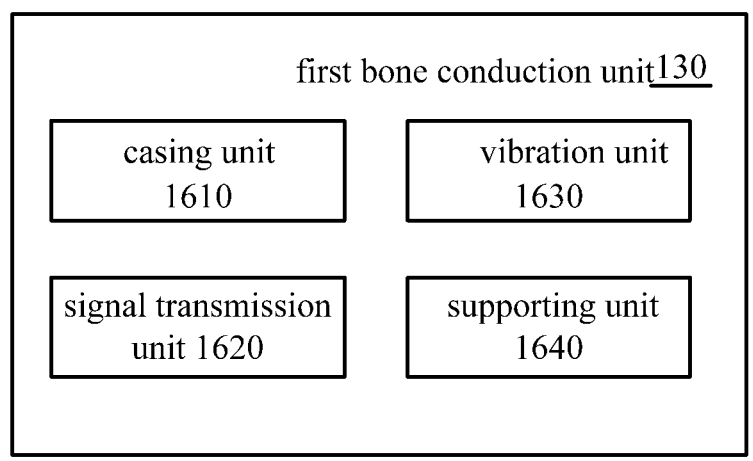
FIG. 16 is an exemplary diagram illustrating a first bone conduction unit according to another embodiment of the present disclosure.

In an embodiment of the present disclosure, in order to protect the first bone conduction unit 130 better and extend its service life, the first bone conduction unit 130 may include a supporting unit made up of elastic materials. Specifically, FIG. 16 is an exemplary diagram illustrating a first bone conduction unit according to an embodiment of the present disclosure. As shown in FIG. 16, the first bone conduction unit 130 may include a casing unit 1610, a signal transmission unit 1620, a vibration unit 1630 and a supporting unit 1640.

Specifically, the casing unit 1610 may be made up of metal or plastic materials and space for accommodation can be formed in the casing unit 1610. The signal transmission unit 1620 can be used to receive the first audio signals and the signal transmission unit 1620 can transmit the received first audio signal to the vibration unit 1630. The vibration unit 1630 is provided in the casing unit 1610.

The first bone conduction unit according to an embodiment of the present disclosure, the vibration unit 1630 can be a piezoelectric vibration unit. Specifically, the vibration unit 1630 may include a substrate and a piezoelectric plate. The substrate of the vibration unit 1630 is connected to the signal transmission unit 1620 so as to receive the first audio signal from the signal transmission unit 1620. According to one example of the present disclosure, the substrate of the vibration unit 1630 can be a metal substrate. The piezoelectric plate is arranged correspondingly to the substrate. A predetermined electric field can be formed inside the piezoelectric plate by the previous polarization process. When the first audio signal is applied to the substrate, the piezoelectric plate and the substrate are bent by the force of the audio signal so that vibrations can be generated according to the first audio signal.

Returning to FIG. 3a and FIG. 3b, FIG. 3a and FIG. 3b also show a diagram of the exemplary case where the vibration unit 1630 vibrates by the force of the first audio signal according to an example of the present disclosure. As known in the art, the first audio signal is an AC signal. Similar to the previous description, as shown in FIG. 3a, when the direction of electric field formed by the first audio signal is the same with the direction of the predetermined electric field formed inside the piezoelectric plate, the piezoelectric plate and the metal substrate in the vibration unit 1630 will bend towards the direction shown by arrow B. On the other hand, as shown in FIG. 3b, when the direction of the electric field formed by the first audio unit is opposite to the direction of the predetermined electric field formed inside the piezoelectric plate, the piezoelectric plate and the metal substrate in the vibration unit 1630 will bend towards the direction shown by arrow C, so that the vibration unit 1630 bends quickly according to the first audio signal output from the signal transmission unit 1620 so as to generate vibrations.

Returning to FIG. 16, the supporting unit 1640 is provided in the casing unit. The supporting unit 1640 supports the vibration unit 1630 so as to ensure that the vibration unit 1630 does not contact the casing unit 1610, so that the vibration unit 1630 can vibrate in the space for accommodation within the casing unit 1610 and the vibrations generated in the vibration unit 1630 are transmitted to the casing unit 1610. Optionally, the supporting unit can be made up of elastic materials so that the room taken by the first bone conduction unit 130 can be reduced. Preferably, the first bone conduction unit can be arranged to have smaller volume. In this case, the supporting unit provided therein must be smaller. The supporting unit is made up of elastic materials, so that the supporting unit does not need to be strictly defined to certain size when the supporting unit is manufactured, thereby reducing the manufacturing complexity.

Specifically, the supporting unit can include at least one supporting module. The first surface of the supporting module contacts the vibration unit and the second surface opposite to the first surface of the supporting module contacts the casing unit. According to an example of the present disclosure, the vibration unit 1630 is shaped into strip. The supporting module is provided at an end of the strip, so that there is a gap at least between the at least middle of the vibration unit and the casing unit.

Figure 17A:
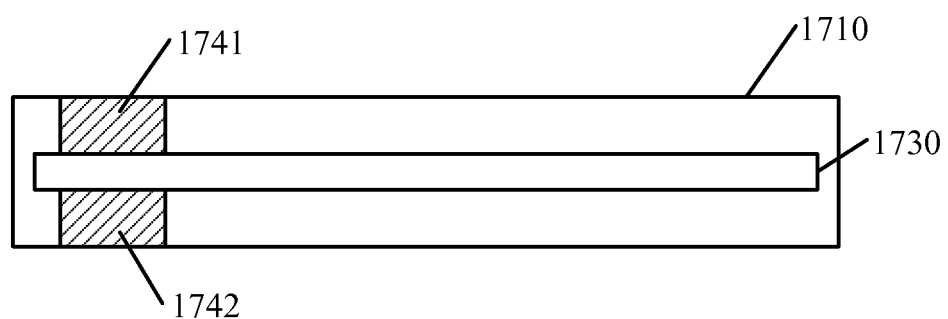
FIG. 17a is a cross view illustrating a first bone conduction unit according to an embodiment of the present disclosure.

FIG. 17a shows a cross view illustrating a first bone conduction unit according to an embodiment of the present disclosure. Similar with the first bone conduction unit 130 described in combination with FIG. 16, the first bone conduction unit 1700 includes a casing unit 1710, a signal transmission unit (not shown), a vibration unit 1730 and a supporting unit. For the sake of brevity, the similarity between each unit in the first bone conduction unit 1700 and each unit in the first bone conduction unit 130 will not be repeated herein.

As shown in FIG. 17a, in the first bone conduction unit 1700, the vibration unit 1730 is provided in the casing unit 1710. The vibration unit 1730 is shaped as a strip. The supporting unit includes a first supporting module 1741 and a second supporting module 1742 provided at one end of the vibration unit 1730. Specifically, the first supporting module 1741 and the second supporting module 1742 are provided correspondingly on the opposite surfaces of the vibration unit 1730, so that there is a gap between the other parts of the vibration unit 1730 and the casing unit 1710, thereby facilitating sufficient vibration for the vibration unit 1730. As shown in FIG. 17a, the first supporting module 1741 is provided between the upper surface of the strip-shaped vibration unit 1730 and the casing unit 1710 and the second supporting module 1742 is provided between the lower surface of the strip-shaped vibration unit 1730 and the casing unit 1710.

In the example shown in FIG. 17a, the first supporting module 1741 and the second supporting module 1742 are provided at the same end of the strip-shaped vibration unit 1730. That is, the strip-shaped vibration unit 1730 is fixed at only one end so that when the vibration unit 1730 receives the first audio signal, the magnitude of the vibration according to the first audio signal is relatively large, so the vibration transmitted to the casing unit 1710 is relatively strong.

Figure 17B:
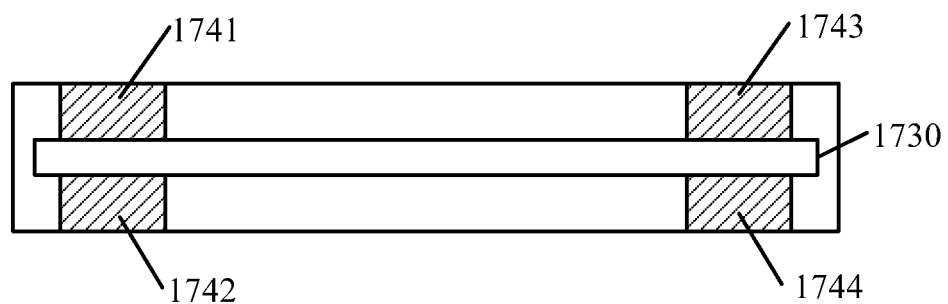
FIG. 17b is a cross view illustrating a first bone conduction unit according to another embodiment of the present disclosure.

However, the present disclosure is not limited thereto. FIG. 17b is a cross view illustrating a first bone conduction unit according to another embodiment of the present disclosure. In the examples shown in FIG. 17a and FIG. 17b, the same parts are identified with the same reference numbers and the description thereof will not be repeated herein. In the example shown in FIG. 17b, considering that the vibration unit 1730 is thin and brittle, so when the vibration is large, it may contact the casing unit and may be damaged. Therefore, the supporting unit may further include a third supporting module 1743 and a fourth supporting module 1744 in addition to the first supporting module 1741 and the second supporting module 1742. As shown in FIG. 17b, the first supporting module 1741 and the second supporting module 1742 are provided correspondingly at a first end of the strip-shaped vibration unit 1730, while the third supporting module 1743 and the fourth supporting module 1744 are provided at a second end of the strip-shaped vibration unit 1730. Therefore, there is gap between the middle part of the vibration unit 1730 and the casing unit 1710 so that when the vibration unit 1730 is vibrating, the vibration unit 1730 is prevented from contacting the casing unit 1710 and being damaged due to the large magnitude of the vibration. Moreover, it can support the vibration unit 1730 more firmly, thereby enhancing the vibration transmission effect.

However, in some cases, in order to make the effect of the sound from the first bone conduction unit softer, it may be required to reduce the vibration magnitude. Furthermore, as described above, since the vibration unit is thin and brittle, in order to ensure that the vibration unit is not easily damaged, according to another example of the present disclosure, a supporting module can be provided correspondingly to the surface of the vibration unit contacting the supporting module, so that the supporting module contacts most part of the certain outer surface of the vibration unit.

Figure 18A:
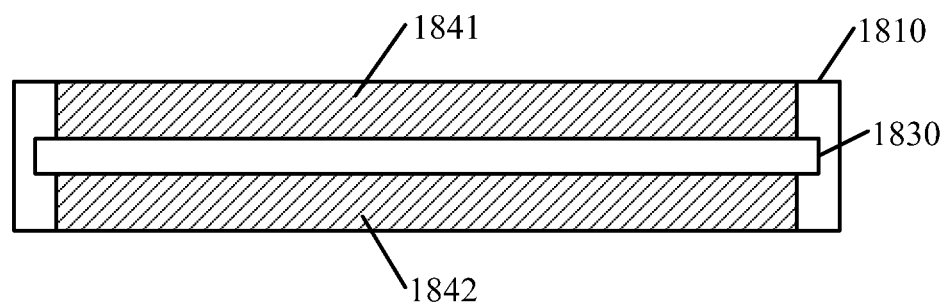
FIG. 18a is a cross view illustrating a first bone conduction unit according to another embodiment of the present disclosure.

FIG. 18a is a cross view illustrating a first bone conduction unit according to another embodiment of the present disclosure. Similar to the first bone conduction unit 130 described in combination with FIG. 1, the first bone conduction unit 1800 includes a casing unit 1810, a signal transmission unit (not shown), a vibration unit 1830 and a supporting unit. For the sake of brevity, the similarity between each unit in the first bone conduction unit 1800 and each unit in the first bone conduction unit 130 will not be repeated herein.

As shown in FIG. 18a, in the first bone conduction unit 1800, the vibration unit 1830 is provided in the casing unit 1810. The vibration unit 1830 is shaped as a strip. The supporting unit includes a first supporting module 1841 and a second supporting module provided on the opposite surfaces of the vibration unit 1830. Specifically, a first supporting module 1841 can be provided correspondingly to the upper surface of the vibration unit 1830 and a second supporting module 1842 can be provided correspondingly to the lower surface of the vibration unit 1830. The first supporting module 1841 can contact most part of the upper surface of the vibration unit 1830 and the second supporting module 1842 can contact most part of the lower surface of the vibration unit 1830. In the present example, the supporting module can be made of elastic materials, such as silicone, foam, rubber and so on, so that even if the supporting module contact most area of the outer surface of the vibration unit 1830, the vibration unit 1830 can still vibrate.

Figure 18B:
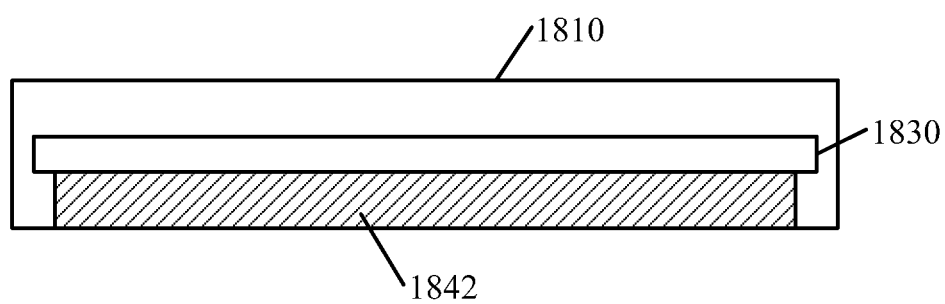
FIG. 18b is a cross view illustrating a first bone conduction unit according to another embodiment of the present disclosure.

In the example shown in FIG. 18a, the supporting unit includes a first supporting module 1841 and a second supporting module 1842 on the two opposite surfaces of the vibration unit 1830. However, the present disclosure is not limited thereto. FIG. 18b is a cross view illustrating a first bone conduction unit according to another embodiment of the present disclosure. In the examples shown in FIG. 18a and FIG. 18b, the same parts are identified with the same reference numbers and the description thereof will not be repeated herein. In the example shown in FIG. 18b, in order to facilitate assembly, the supporting unit can include only the second supporting module 1842. Specifically, the second supporting module 1842 can be provided correspondingly to the lower surface of the vibration unit 1830. In the present example, the vibration unit 1830 can stick to the second supporting module 1842 and the second supporting module 1842 can stick to the casing unit 1810. For example, the second supporting 1842 is made of double-side tapes with a predetermined thickness and hardness.

Further, according to another embodiment of the present disclosure, the first bone conduction unit 130 may further include a medium unit. The medium unit may include padding medium provided between the vibration unit and the casing unit, such as air, liquid and so on. The padding medium is determined according to the required vibration state of the vibration unit. For example, when it is required that the vibration magnitude of the vibration state should be large and the vibration frequency should be quick, the padding medium can be air. When it is required that the vibration magnitude of the vibration state should be small and the vibration frequency should be slow, the padding medium can be liquid, such as water or oil.

In a first bone conduction unit according to an embodiment of the present disclosure, the first audio signal is transmitted by making the wearer sense the vibration generated by the vibration unit of the first bone conduction unit, so that, compared with the conventional sound transmission or playing modules, such as earphones, speakers and so on, the space occupied by the module is decreased while the audio output quality is improved. Further, in the first bone conduction unit according to an embodiment of the present disclosure, since the vibration unit is provided in the space for accommodation inside the casing unit and the vibration unit is ensured not to contact the casing unit by supporting the vibration unit with supporting unit provided in the casing unit, the vibration unit is protected while the vibration space of the vibration unit is ensured, and the vibration generated by the vibration unit can be transmitted to the casing unit through the supporting unit, and further transmitted to the wearer.

Additionally, according to another embodiment of the present disclosure, the first bone conduction unit shown in FIG. 16 may further include a first buffer unit provided on the first area of the outer surface of the casing unit. The first buffer unit can weaken the vibration passing through the first vibration unit. Specifically, when the wearer uses the first bone conduction unit, the first buffer unit can contact the wearer's body so as to transmit the weakened vibration to the wearer so that the wearer can sense the vibrations generated by the vibration unit.

Additionally, according to another embodiment of the present disclosure, the first bone conduction unit show in FIG. 16 may further include a second buffer unit provided on the second area of the outer surface of the casing unit. The second buffer unit can weaken the vibration passing through the second vibration unit. The second area can be the area on the outer surface of the casing unit except the first area. For example, the first area and the second area can be provided on two opposite outer surfaces of the casing unit.

Further, the extent to which the second buffer unit weakens the vibration is greater than the extent to which the first buffer unit weakens the vibration, so as to prevent the people other than the wearer from hearing the content that the wearer hears through the first bone conduction unit, thereby protecting the wearer's privacy.

With the head-mounted electronic device provided by the above embodiments of the present disclosure, the wearer can hear the audio by using the bone conduction unit provided on the inner side of the head-mounted electronic device, thereby improving the audio output quality. Moreover, since it is unnecessary to set a conventional audio playing unit, such as a headphone, a speaker and so on, in the head-mounted electronic device, the space occupied by the head-mounted electronic device is reduced while preventing other people from knowing the content that the wearer is hearing.

Figure 4:
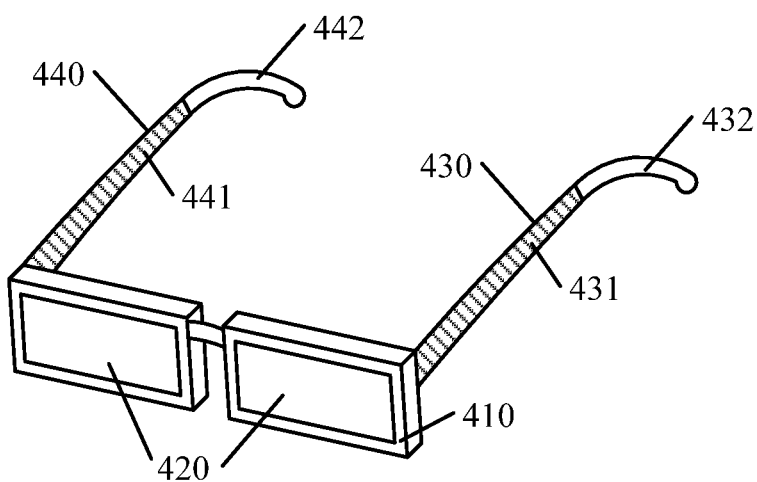
FIG. 4 is a diagram showing an exemplary case of the head-mounted electronic device shown in FIG. 1.

FIG. 4 is a diagram showing an exemplary case of the head-mounted electronic device shown in FIG. 1. The head-mounted electronic device 400 is a glasses style electronic device. The head-mounted electronic device 400 includes a frame part 410, a lens part 420 connected to the frame part 410, a first supporting arm 430, a second supporting arm 440, a third retaining part, a processing unit and a first bone conduction unit.

As shown in FIG. 4, the first supporting arm 430 includes a first connection part 431 (as shown in the shaded portion in FIG. 4) and a first retaining part 432. The first connection part 431 connects the frame part 410 with the first retaining part 432. The second supporting arm 440 includes a second connection part 441 (as shown in the shaded portion in FIG. 4) and a second retaining part 442. The second connection part 441 connects the frame part 410 and the second retaining part 442. The third retaining part (not shown) is provided on the frame part 410. Specifically, the third retaining part can be provided at a position on the frame part 410 between the two lens parts. The head-mounted electronic device is retained on the wearer's head through the first retaining part, the second retaining part and the third retaining part. Specifically, the first retaining part and the second retaining part can be used to support the first supporting arm 430 and the second supporting arm 440 on the wearer's ears while the third retaining part can be used to support the frame part 410 on the wearer's nose.

The processing unit (not shown) may be provided in the first supporting arm 430 and/or the second supporting arm 440. The processing unit can perform audio processes and output first audio signals.

Components, such as a display unit, a processing unit and so on, provided in the present head-mounted electronic device are often integrated in the main body of the head-mounted display apparatus. The main body of the electronic device is supported on the wearer's nose so that most of the main body of the electronic device locates in the visible area of the wearer. However, as the main body part of the display apparatus is often quite bulky and heavy, which brings relatively great pressure to wearer's nose and makes the wearer feel uncomfortable while wearing the head-mounted display apparatus. Moreover, as it is easy to be dropped, it is not convenient for the wearer to perform activities, such as turning his/her head and so on, when he/she is wearing such a head-mounted display apparatus.

In view of this, according to an example of the present disclosure, the processing unit can be provided in the first retaining part and/or the second retaining part, so that a first distance between the geometric center of the head-mounted electronic device and the plane of the lens part is less than a second distance between the gravity center of head-mounted electronic device and the plane of the lens part. That is, the gravity center of head-mounted electronic device is made as far away from the plane where that lens part is, and close to the first retaining part and the second retaining part so as to reduce the burden borne by the nose when the wearer is wearing the head-mounted electronic device. Thereby, it is convenient for the wearer to perform activities, such as turning the head and so on, and it is convenient for the wearer to use and wear.

Furthermore, according to another example of the present disclosure, the head-mounted electronic device may further comprise a power supply unit, such as a battery and so on. The processing unit can be provided in the first retaining part and the power supply unit can be provided in the second retaining part so that the vertical distances from the gravity center of the head-mounted electronic device to the first supporting arm and the second supporting arm are substantially the same. That is, the gravity center of the head-mounted electronic device is substantially in the middle of the first supporting arm and the second supporting arm, so that when the wearer is wearing the head-mounted electronic device, the pressure on the left and right ears are balanced.

The first bone conduction unit (not shown) can be provided on the inner side of the first connection part 431 of the first retaining arm 430 and generates vibrations according to the first audio signal. As described above, the head-mounted electronic device 400 may further include a power amplification unit for receiving and amplifying the first audio signal, and applying the amplified first audio signal to the first bone conduction unit. The power amplification unit can be provided in the first supporting arm. As described above, the first bone conduction unit can have the structure as shown in FIG. 2, the upper metal substrate, the piezoelectric plate and the lower metal substrate are placed sequentially in the direction perpendicular to the length direction of the first connection part 431. Further, as described above, the first bone conduction unit can also include an insulating protective layer covering the upper layer of the metal substrate, such as a silica protective layer and so on. When the head-mounted electronic device is worn on the wearer's head, the wearer's head contacts the insulating flexible protective layer. The insulating protective layer can be part of the first connection part 431.

Further, according to another embodiment of the present disclosure, the processing unit can further perform the audio process and output a second audio signal, wherein the second audio signal is the same as or different from the first audio signal. In addition, the electronic device 400 may further include a second bone conduction unit and a second power supply unit provided in the second supporting arm. The second bone conduction unit may be provided on the inner side of the second supporting arm, and vibrates according to the second audio signal, so that the wearer can hear the second audio through the vibrations generated. The second bone conduction unit is similar to the first bone conduction unit and the second power supply unit is similar to the first power supply unit, so they will not be repeated herein. When the head-mounted electronic device is worn on the wearer's head, the second bone conduction unit contacts the wearer's head, so that the wearer can sense vibration generated by the second bone conduction unit.

Figure 5:
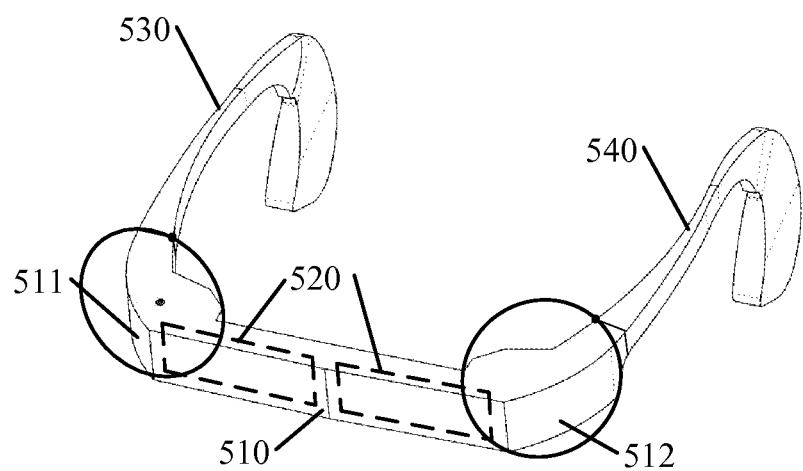
FIG. 5 is a diagram illustrating another exemplary case of the head-mounted electronic device shown in FIG. 1.

Further, according to another embodiment of the present disclosure, the head-mounted electronic device may further include a first data transmission line and a display unit. FIG. 5 is a diagram illustrating another exemplary case of the head-mounted electronic device shown in FIG. 1. Similar to the head-mounted electronic device 400, the head-mounted electronic device 500 is a glasses style electronic device. The head-mounted electronic device 500 includes a frame part 510, a lens part 520 connected to the frame part 510, a first supporting arm 530, a second supporting arm 540, a third retaining part, a processing unit and a first bone conduction unit which are similar to the frame part 410, the lens part 420 connected to the frame part 410, the first supporting arm 430, the second supporting arm 440, the third retaining part, the processing unit and the first bone conduction unit respectively, so they will not be repeated herein. In the present embodiment, the processing unit can further perform video processing and output the first video signal.

Further, the head-mounted electronic device 500 in the embodiment may further include a first data transmission line and a display unit. The first data transmission line can be provided in the fixing unit and the frame part. The first data transmission line can transmit the first video signal to the display unit. The display unit can display to the wearer according to the first video signal. In the present embodiment, the first video signal can be the video signal corresponding to the first audio signal. For example, when the wearer watches movies with the head-mounted electronic device 500, the first video signal can be the image signal of the movie while the first audio signal can be the audio signal of the movie corresponding to the image signal. For another example, when the wearer makes a video call through the head-mounted electronic device 500, the first video signal can be the image signal from the communication party while the first audio signal can be the audio signal from the communication party. Alternatively, the first video signal is independent of the first audio signal. For example, the first video signal can be an image signal related to pictures, video images, texts and combinations of texts and images. An independent storage unit can be set in the head-mounted electronic device 500 to store these image files. Alternatively, the head-mounted electronic device 500 can further receive the image to be displayed from an electronic device, such as a computer, a smart phone, a multimedia player and the like, which is connected to the head-mounted electronic device 500 in a wired or wireless manner. For example, the head-mounted electronic device 500 may further include a communication unit to receive the image file to be displayed from an electronic device, such as a computer, a smart phone, a multimedia player and the like. Further, in this embodiment, although the data transmission line is taken as an example for description, the present disclosure is not limited thereto. For example, according to another example of the present disclosure, the first video signal can be transmitted to the display unit in a wireless manner.

Figure 6:
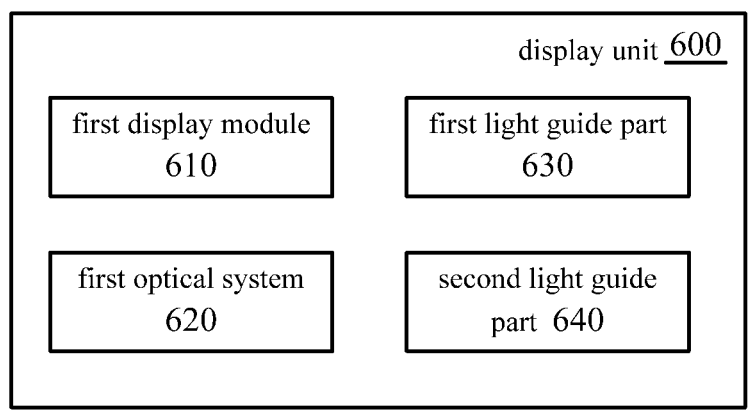
FIG. 6 is a block diagram showing a display unit according to an example of the present disclosure.
Figure 15:
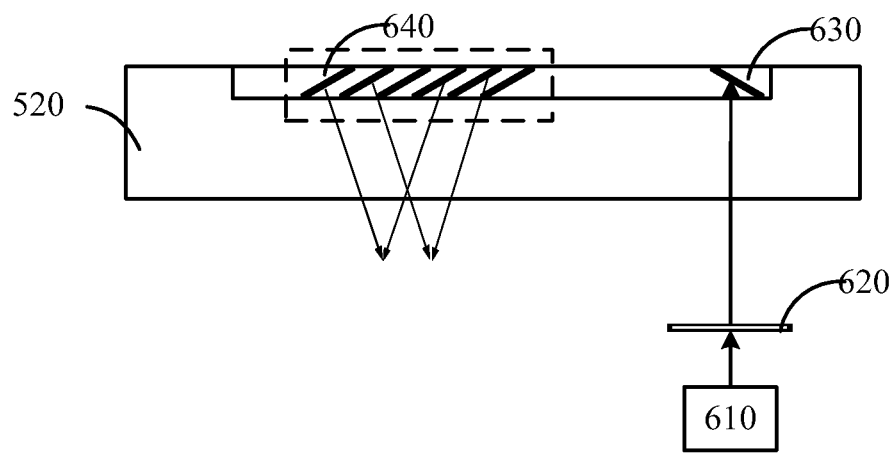
FIG. 15 is a diagram illustrating a schematic case of the display unit shown in FIG. 6.

FIG. 6 is a block diagram showing a display unit according to an example of the present disclosure. As shown in FIG. 6, the display unit 600 may include a first display module 610, a first optical system 620, a first light guide part 630 and a second light guide part 640. FIG. 15 is a diagram illustrating a schematic scenario of the display unit 600 shown in FIG. 6.

The first display module 610 may be provided in the frame part 510 and connected to the first data transmission line. The first display module 610 can display the first image according to the first video signal transmitted by the first data transmission line. According to an example of the present disclosure, the first display module 610 may be a display module with a small-sized miniature screen.

The first optical system 620 may be also provided in the frame part 510. The first optical system 620 can receive the light emitted from the first display module and change the optical path of the light emitted from the first display module so as to form a first enlarged virtual image. That is, the first optical system 620 has a positive refractive force, so that the wearer can clearly see the first image, and the size of the image seen by the wearer is not limited by the size of the display unit.

For example, the optical system may include a convex lens. Alternatively, in order to reduce aberrations and avoid the imaging disruption (such as dispersion and so on), and in order to bring the wearer a better visual experience, the optical system includes a lens assembly formed by a plurality of convex and concave lenses. Further, according to an example of the present disclosure, a first display module 610 and a first optical system 620 can be provided correspondingly along the optical axis of the optical system. Alternatively, according to another example of the present disclosure, the display unit may further include a fifth light guide part, so as to transmit the light, emitted from the first display module 610, to the first optical system 620.

As shown in FIG. 15, after the first optical system 620 receives the light emitted from the first display module 610 and changes the optical path of the light emitted from the first display module 610, the first light guide part 630 can transmit the light passing through the first optical system to a second light guide part 640. The second light guide part 640 may be provided in the lens part 520. And the second light guide part can receive the light transmitted through the first light guide part 630 and reflect the light transmitted by the first light guide part 630 to the eyes of the wearer who wears the head-mounted electronic device.

Returning to FIG. 5, optionally, the lens part 520 can satisfy the first predetermined transmission rate in the direction from the inner side to the outer side, so that the wearer can view the first enlarged virtual image while watching the surrounding environments. On the other hand, the lens satisfies the second predetermined transmission rate in the direction from the outer side to the inner side. Thus, when the light in the surroundings is strong, the light can be partly refracted or reflected.

Further, as shown in FIG. 5, according to an example of the present disclosure, the frame part 510 may include a first pile head part 511 connected to the first supporting arm 530 and a second pile head part 512 connected to the second supporting arm 540 (the part of the frame part shown in the circles in FIG. 5).

Figure 7:
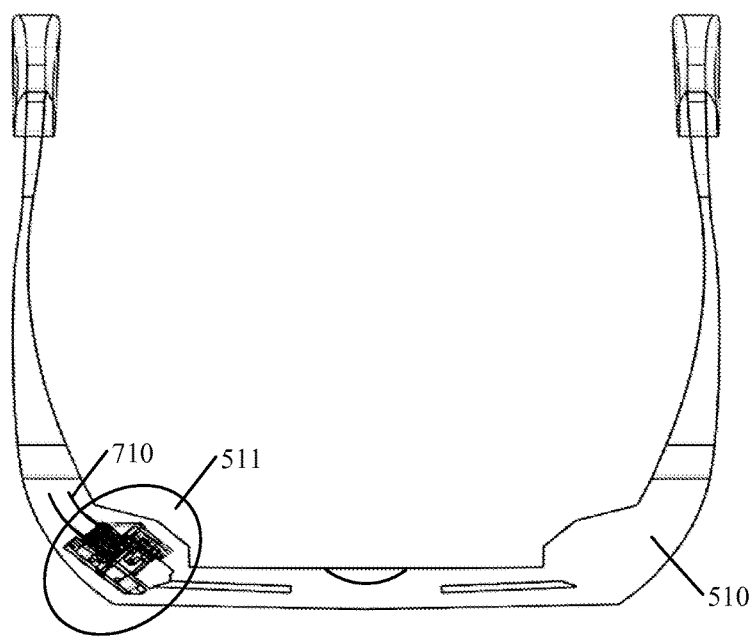
FIG. 7 is a top view of an exemplary case according to the head-mounted electronic device shown in FIG. 5.

FIG. 7 is a diagram showing a top view of an exemplary case according to the head-mounted electronic device shown in FIG. 5, and the internal structure of the frame part 510 is shown in FIG. 7. As shown in FIG. 7, the first display module and the first optical system in the display unit are provided in the first pile head part 511 of the frame part 510, and the first display module is connected to the first data transmission line 710. Further, the lens part 520 is provided in the frame part 510. As described above, the first light guide part can transmit the light passing through the first optical system to the second light guide part provided in the lens part 520.

In the example shown in FIG. 5, the processing unit can further perform video processing and output a second video signal, wherein the second video signal is the same as or different from the first video signal. The head-mounted electronic device 500 may further include a second data transmission line. The second data transmission line can be provided in the fixing unit and the frame part so as to transmit the second video signal to the display unit. The display unit can also include a second display module, a second optical system, a third light guide part and a fourth light guide part.

The second display module can be provided in the frame part, and connected to the second data transmission line. The second display module can display the second image according to the second video signal transmitted by the second data transmission line. According to an example of the present disclosure, the second display module may be a display module with a small-sized miniature screen.

The second optical system can also be provided in the frame part. The second optical system can receive the light emitted from the second display module and change the optical path of the light emitted from the second display module so as to form a second enlarged virtual image. That is, the second optical system has a positive refractive force. For example, the optical system may include a convex lens. Alternatively, in order to reduce aberrations and avoid the imaging disruption (such as dispersion and so on), and in order to bring the wearer a better visual experience, the optical system includes a lens assembly formed by a plurality of convex and concave lenses. Further, according to an example of the present disclosure, a second display module and a second optical system can be provided correspondingly along the optical axis of the optical system.

After the second optical system receives the light emitted from the second display module and changes the optical path of the light emitted from the second display module, the third light guide part can transmit the light passing through the second optical system to the fourth light guide part. The fourth light guide part may be provided in the lens part. And the fourth light guide part can receive the light transmitted through the third light guide part and reflect the light transmitted by the third light guide part to the eyes of the wearer who wears the head-mounted electronic device. As shown in FIG. 5, the lens part 520 can include a first lens for one eye of the wearer's and a second lens for the other eye of the wearer's. The second light guide part and the fourth light guide part can be provided in the first lens and the second lens respectively, so that the wearer can both eyes to watch.

Figure 8:
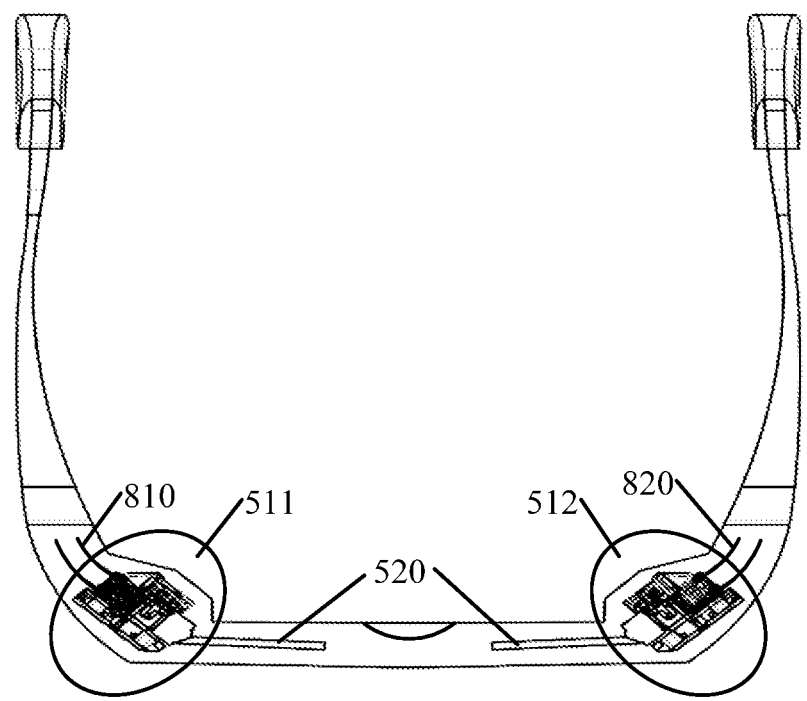
FIG. 8 is a top view of another exemplary case according to the head-mounted electronic device shown in FIG. 5.

The second display module and the second optical system are provided in the second pile head part 512. FIG. 8 is a top view of an exemplary case according to the head-mounted electronic device shown in FIG. 5, and the internal structure of the frame part 510 is shown in FIG. 8. As shown in FIG. 8, the first display module and the first optical system in the display unit are provided in the first pile head part 511 of the frame part 510, and the first display module is connected to the first data transmission line 810. Further, the lens part 520 is provided in the frame part 510. As described above, the first light guide part can transmit the light passing through the first optical system to the second light guide part provided in the lens part 520.

On the other hand, the second display module and the second optical system in the display unit are provided in the second pile head part 512 of the frame part 510, and the second display module is connected to the second data transmission line 820. Further, as described above, the third light guide part can transmit the light, which passes through the second optical system, to the fourth light guide part provided in the lens part 520.

Figure 9:
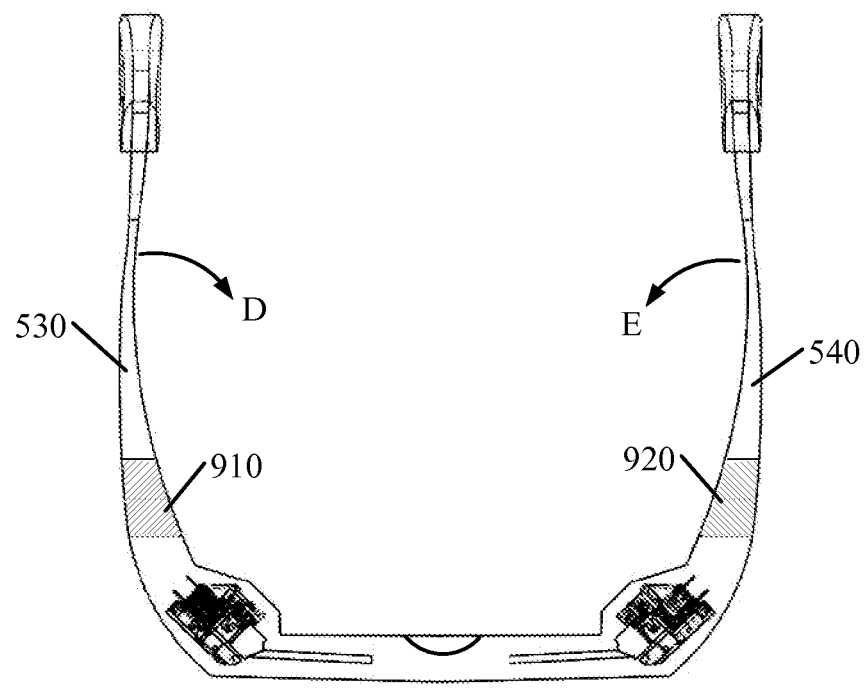
FIG. 9 is a top view showing an exemplary case according to the head-mounted electronic device shown in FIG. 8.

Optionally, the supporting arm and the frame part 510 of the electric device 500 can be connected through a first elastic region. FIG. 9 is a top view showing an exemplary case according to the head-mounted electronic device shown in FIG. 8. As shown in FIG. 9, the first connection part of the first supporting arm 530 can include a first elastic region 910 (as shown in the shaded area in FIG. 9) connected to the frame part 510, and the first supporting arm 530 can bend with respect to the frame part through the first elastic region 910 (e.g., along the direction shown by arrow D). Similarly, the second connection part of the second supporting arm 540 may include a second elastic region 920 connected to the frame part 510 (as shown in the shaded area in FIG. 9) and the second supporting arm 540 can bend with respect to the frame part through the second elastic region 920 (e.g., in the direction shown by arrow E). When the wearer does not need to wear the head-mounted electronic device 500, the first supporting arm 530 and the second supporting arm 54 can be bent so as to reduce the space occupied by the head-mounted electronic device 500 and make it easy to carry.

Figure 10:
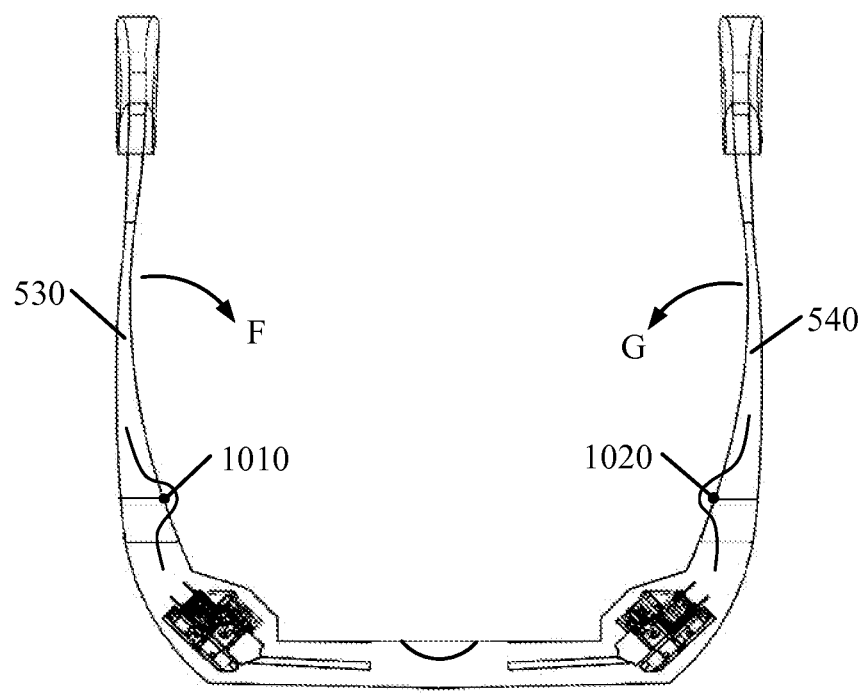
FIG. 10 is a top view showing an another exemplary case according to the head-mounted electronic device shown in FIG. 8.

Alternatively, the supporting arm and the frame part 510 can be connected through a pivot. FIG. 10 is a top view showing of an exemplary case according to the head-mounted electronic device shown in FIG. 8. As shown in FIG. 10, the first connection part of the first supporting arm 530 can be connected to the frame part 510 through a first pivot 1010 and the first supporting arm 530 can rotate around the first pivot 1010 (e.g., in the direction shown by arrow F). Similarly, the second connection part of the second supporting arm 540 can be connected to the frame part 510 through a second pivot 1020 and the second supporting arm 540 can rotate around the second pivot 1020 (e.g., in the direction shown by arrow G).

As shown in FIG. 10, the first data transmission line is arranged along the inner side of the first pivot 1010 (i.e., the side close to the wearer's head), and the second data transmission line is arranged along the inner side of the second pivot 1020 (i.e., the side close to the wearer's head) so as to prevent damage to the first data transmission line and the second data transmission line caused when the first supporting arm 530 and the second supporting arm 540 are rotated around the pivot.

Figure 11:
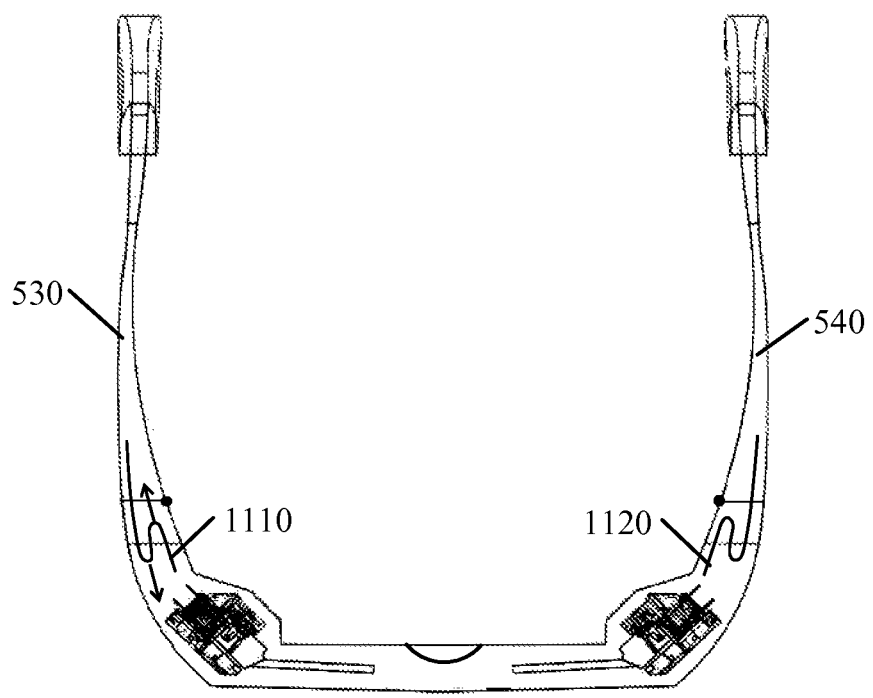
FIG. 11 is a top view showing an another exemplary case according to the head-mounted electronic device shown in FIG. 8.

Further, the first data transmission line and the second data transmission line can be bent in the supporting arm and/or the frame part of the head-mounted electronic device 500 in advance, so as to provide a flexible margin. FIG. 11 is a top view showing another exemplary case according to the head-mounted electronic device shown in FIG. 8. The first data transmission line 1110 and the second data transmission line 1120 can be bent in advance into the shape shown in FIG. 11. When the first supporting arm 530 and the second supporting arm 540 are bent, the first data transmission line 1110 and the second data transmission line 1120 can adjust the bending shape automatically so as to accommodate the deformation brought to the data transmission line caused by the bending of the first supporting arm and the second supporting arm. Elastic restraint can be applied to the data transmission line in the middle of the supporting arm and/or the frame part so that the data transmission line can adjust its shape automatically when the wearer needs to wear the head-mounted electronic device 500.

Further, according to the example of the present disclosure, the head-mounted electronic device according to the embodiment of the present disclosure may further include a first touch sensing unit to receive the wearer's touch input and send the touch detection result to the processing unit so that the processing unit can generate the corresponding control instruction. The first touch sensing unit can be provided on the outer side of the first connection part, wherein the outer side of the connection part is the side of the connection part that is farther away from the wearer when the head-mounted electronic device is worn on the wearer's head. Optionally, in the first connection part, the first touch sensing unit is provided corresponding to at least part of the first bone conduction unit and the first data transmission line is located between the first touch sensing unit and the first bone conduction unit. In addition, there is a predetermined distance between the first data transmission line and the plane where the touch panel of the first touch sensing unit is, so as to prevent the first data transmission line from electromagnetically interfering the detection of the first touch sensing unit.

Figure 14:
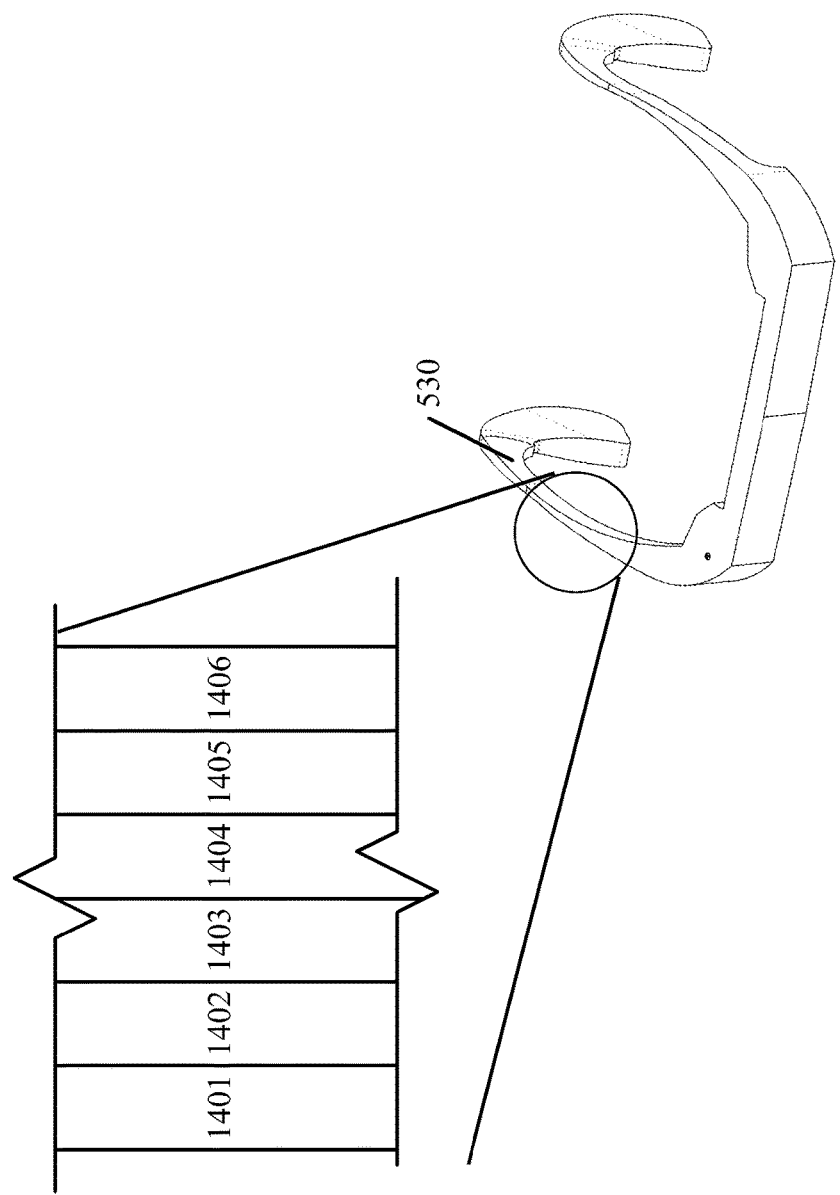
FIG. 14 is an enlarged partial cross view of the first supporting arm of the head-mounted electronic device shown in FIG. 5.

FIG. 14 is an enlarged partial cross view of the first supporting arm 530 of the head-mounted electronic device shown in FIG. 5. As shown in FIG. 14, a protective layer 1401 of the first bone conduction unit, which contacts the wearer's head, a bone conduction layer 1402 of the first bone conduction unit (for example, the piezoelectric plate and the metal substrate as described above), a first data transmission line layer 1403, the spacing layer 1404 between the first data transmission line layer 1403 and the touch-sensitive layer 1405 of the first touch sensing unit, the touch-sensitive layer 1405 of the first touch sensing unit and the protective layer 1406 of the touch sensing unit can be provided sequentially from the inner side of the first supporting arm 530 (i.e. the side close to the wearer's head when the head-mounted electronic device is worn on the wearer's head) to the outer side of the first supporting arm 530 (i.e. the side farther away from the wearer's head when the head-mounted electronic device is worn on the wearer's head). With this structure, the positions of first bone conduction unit and the first touch sensing unit are reasonably provided on the head-mounted electronic device, so the audio output quality is improved while the product appearance design of the electronic device is optimized, thereby making it convenient for the wearer to use and operate.

Figure 12:
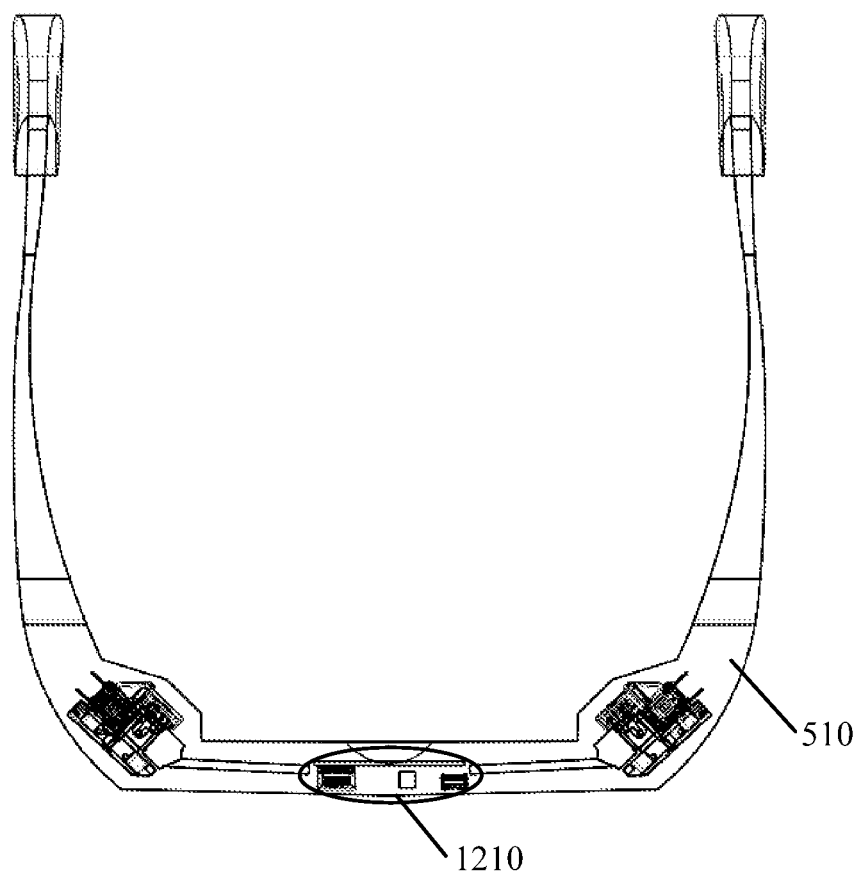
FIG. 12 is a top view showing still an another exemplary case according to the head-mounted electronic device shown in FIG. 8.

Further, according to another example of the present disclosure, the head-mounted electronic device according to an embodiment of the present disclosure may further include a capturing unit. FIG. 12 is a top view of another exemplary case according to the head-mounted electronic device shown in FIG. 8. As shown in FIG. 12, the capturing unit 1210 can be arranged on the position of the frame part 510 which is located between two eyes when the wearer is wearing the electronic device on the head. According to the example of the present disclosure, the capturing unit 1210 may include image capturing module, the sound collection unit and/or proximity sensing module and so on, so that with the head-mounted electronic device according to the embodiment of the present disclosure, operations, such as taking photos, taking videos and so on, can be performed. For example, the capturing unit 1210 can acquire the image of the operation body, such as the wearer's hand, and send the acquired image to the processing unit of the head-mounted electronic device so that the processing unit can generate the corresponding control instruction according to the actions of the operation body. In FIG. 12, the example, wherein the capturing unit is provided on the position between the two eyes when the head-mounted electronic device is worn on the wearer's head, is described, but the present disclosure is not limited thereto. For example, the capturing unit includes the plurality of capturing modules provided on the frame part. More specifically, the image capturing module, the sound acquisition unit and/or proximity sensing module can be provided symmetrically in the first pile head part and the second pile head part of the frame part.

Figure 13:
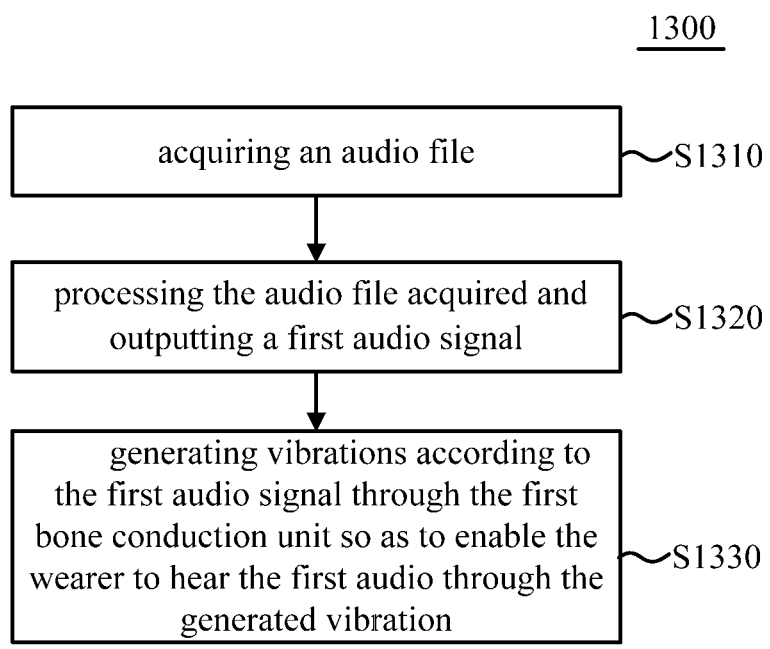
FIG. 13 is a flow chart of the audio processing method according to the embodiment of the present disclosure.

Next, referring to FIG. 13, an audio processing method of an embodiment of the present disclosure is described. FIG. 13 is a flow chart of the audio processing method 1300 according to the embodiment of the present disclosure. The audio processing method 1300 is applied to the head-mounted electronic device shown in FIG. 1 and FIG. 4 to FIG. 12. As described above, the head-mounted electronic device according to the embodiment of the present disclosure may include a fixing unit and a first bone conduction unit. The head-mounted electronic device can be worn on the wearer's head through the fixing unit. The first bone conduction unit may be provided on the inner side the fixing unit, wherein the inner side of the fixing unit is the side closer to the wearer's head when the head-mounted electronic device is worn on the wearer's head. When the head-mounted electronic device is worn on the wearer's head, the first bone conduction contacts the wearer's head. The head-mounted electronic device according to the embodiment of the present disclosure is described above in detail combined with FIG. 1 and FIGS. 4 to 12, so the description won't be repeated for concision.

As shown in FIG. 13, in step S1310, the audio file is acquired. For example, audio files can be stored in the head-mounted electronic device 100 in advance, and the stored audio files can be acquired in step S1310. For another example, the head-mounted electronic device 100 can further include a transmitting/receiving unit. In step S1310, the audio file transmitted from another electronic device can be received through the transmitting/receiving unit.

In step S1320, the acquired audio file is processed and the first audio signal is output. Then, in step S1330, vibrations are generated through the first bone conduction unit according to the first audio signal, so that the wearer can hear the first audio through the generated vibration. According to an example of the present disclosure, in step S1330, the first audio signal can be directly input into the first bone conduction unit and the first bone conduction unit can generate vibration according to the first audio signal. Alternatively, according to another example of the present disclosure, the head-mounted electronic device can further include a power amplification unit. In step S1330, the power amplification unit can receive the first audio signal and amplifies the first audio signal, wherein the amplified audio signal is an AC voltage signal. Then, the power amplification unit can apply the amplified first audio signal to the first bone conduction unit. The first bone conduction unit can be driven by the amplified first audio signal to generate vibration.

With the audio processing method provided by the above embodiment of the present disclosure, the wearer can hear the audio by using the bone conduction unit provided on the inner side of the electronic device, thereby improving the audio output quality. Further, since it is unnecessary to provide a conventional audio playing unit, such as a speaker, a headphone and so on, in the head-mounted electronic device, the space occupied by the head-mounted electronic device is reduced while preventing the content heard by the wearer from being known by others.

Further, as shown in FIG. 4, the head-mounted electronic device is glasses-style electronic device. The head-mounted electronic device can further include a frame part and a lens part connected to the frame part. The fixing unit of the head-mounted electronic device can include a first supporting arm having a first connection part and a first retaining part, and a second supporting arm having a second connection part and a second retaining part, wherein the first connection part is configured to connect the frame part and the first retaining part, and the second connection part is configured to connect the frame part and the second retaining part. The first bone conduction unit may be provided on the inner side of the first supporting arm. In addition, the frame part comprises a third retaining part. Specifically, the third retaining part may be provided at the position between the two lens parts in the frame part 410. The head-mounted electronic device can be retained on the wearer's head through the first retaining part, the second retaining part and the third retaining part. Specifically, the first retaining part and the second retaining part may be used to support the first supporting arm and the second supporting arm on the wearer's ears while the third retaining part can be used to support the frame part at the wearer's nose.

Further, as shown in FIG. 5 to FIG. 12, the head-mounted electronic device may further include a first data transmission line and a display unit connected to the first data transmission line provided in the fixing unit and the frame part. Specifically, the display unit may include a first display module, a first optical system, a first light guide part and a second light guide part.

The first display module may be provided in the frame part and connected to the first data transmission line. The first optical system may also be provided in the frame part. The first optical system can receive the light emitted from the first display module and change the optical path of the light emitted from the first display module so as to form a first enlarged virtual image. That is, the first optical system has a positive refractive force. For example, the optical system may include a convex lens. Alternatively, in order to reduce aberrations and avoid the imaging disruption (such as dispersion and so on), and in order to bring the wearer a better visual experience, the optical system includes a lens assembly formed by a plurality of convex and concave lenses. Further, according to an example of the present disclosure, a first display module and a first optical system can be provided correspondingly along the optical axis of the optical system. The first light conduction part can transmit the light passing through the first optical system to the second light conduction part and the second light conduction part can reflect the light transmitted by the first light conduction part to the eyes of the wearer who wears the head-mounted electronic device, wherein, the second light conduction part is provided in the lens part.

In this case, the method described in FIG. 13 can also include processing the video file associated with the audio file and output the first video signal associated with the first audio file. For example, when the wearer watches a movie through the head-mounted electronic device 500, the first video signal may be an image signal of the movie and the first audio signal may be the audio signal of the movie corresponding to the image signal. For another example, when the wearer is conducting a video call with the head-mounted electronic device 500, the first video signal may be image signal from the communication party, and the first audio signal may be audio signal from a communication party. Then, the first video signal is transmitted to the first display module in the display unit through the first data transmission line and the first image is displayed through the first display module according to the first video signal. After the first enlarged virtual image is formed through optical path changing of the first image by the first optical system, the first light guide part transmits the light passing through the first optical system to the second light conduct part, so as to reflect the first enlarged virtual image to the wearer who wears the head-mounted electronic device through the second light guide part.

In addition, according to another example of the present disclosure, the head-mounted electronic device may further include a first touch sensing unit provided on the outer side of the first connection part, wherein the outer side of the connection part is the side, which is farther away from the wearer, of the connection part when the head-mounted electronic device is worn on the wearer's head. In this case, the method 1300 shown in FIG. 13 can further include detecting the wearer's touch input by a first touch sensing unit and generating a control command for the first audio signal according to the wearer's touch input.

Those skilled in the art can recognize that the units and algorithm steps of each example described in combination with the embodiments disclosed herein can be implemented by electronic hardware, computer software, or a combination of the two. In order to clearly illustrate the interchangeability of hardware and software, in the above description, the composition and the steps of each example has been generally described according to functions. Whether these functions are to be performed by hardware or software depends on the particular application and the technical solution design constraints of the technical solution. Those skilled in the art can implement the described functions by using different methods for each specific application, but this implementation should not exceed the scope of the present disclosure.

Those skilled in the art can understand that various modifications, combinations, sub-combinations and alterations can be made depending on the design requirements and other factors insofar as they are within the scope of the appended claims and their equivalents.

The invention claimed is:

1. A head-mounted electronic device, comprising:
   a fixing unit by which the head-mounted electronic device is enabled to be worn on the wearer's head;
   a processing unit, provided in the fixing unit and configured to perform audio processing and output a first audio signal;
   a first bone conduction unit, provided on the inner side of the fixing unit, configured to generate vibrations according to the first audio signal, so that the wearer can hear the first audio through the generated vibration;
   wherein the inner side of the fixing unit is the side of the fixing unit which is closer to the wearer's head when the head-mounted electronic device is worn on the wearer's head; and
   when the head-mounted electronic device is worn on the wearer's head, the first bone conduction unit contacts the wearer's head, so that the wearer can sense vibrations generated by the first bone conduction unit,
   wherein the head-mounted electronic device is a glasses style electronic device, and the head-mounted electronic device further comprises:
   a frame part;
   a lens part, connected to the frame part;
   the fixing unit including:
      a first supporting arm, including a first connection part and a first retaining part, wherein the first connection part is configured to connect the frame part with the first retaining part;
      a second supporting arm, including a second connection part and a second retaining part, wherein the second connection part is configured to connect the frame part with the second retaining part; and
      a third retaining part, provided on the frame part,
   wherein, the first bone conduction unit is provided on the inner side of the first supporting arm, and the first retaining part, the second retaining part and the third retaining part are configured to retain the head-mounted electronic device on the wearer's head,
   wherein the head-mounted electronic device further comprises:
      a power amplification unit, provided in the first supporting arm and configured to amplify the first audio signal and apply the amplified first audio signal to the first bone conduction unit, wherein the amplified first video signal is an AC voltage signal, the first bone conduction unit being provided on the inner side of the first connection part of the first supporting arm, and generating vibrations according to the AC voltage signal, wherein the first bone conduction unit comprises:
  a metal substrate, connected to the power amplification unit; and
  a piezoelectric plate, placed corresponding to the metal substrate,
  wherein, the piezoelectric plate is polarized previously so that a predetermined electric field can be formed inside the piezoelectric plate, and
  when an AC voltage from the power amplification unit is applied to the metal substrate, the piezoelectric plate and the metal substrate are bent by force of the AC voltage so that vibrations can be generated according to the first audio signal.

2. The head-mounted electronic device according to claim 1, the first bone conduction unit comprises:
  a casing unit, inside which space for accommodation is formed;
  a signal transmission unit, configured to receive audio signals;
  a vibration unit, provided in the casing unit, comprising:
    the metal substrate, connected to the signal transmission unit, and
    the piezoelectric plate, provided correspondingly to the metal substrate,
  wherein a predetermined electric field is formed inside the piezoelectric plate by pre-polarization process,
  when the first audio signal is applied to the metal substrate, the piezoelectric plate and the metal substrate are bent by the force of the first audio signal so as to vibrate according to the first audio signal;
  a supporting unit, provided in the casing unit and configured to support the vibration unit so as to ensure that the vibration unit does not contact the casing unit so that the vibration unit can vibrate in the space for accommodation inside the casing unit, and configured to transmit the vibrations generated by the vibration unit to the casing unit.

3. The head-mounted electronic device according to claim 2, comprising:
  a buffer unit, provided on an area of the outer surface of the casing unit and configured to weaken the vibration passing through the buffer unit.

4. The head-mounted electronic device according to claim 2, wherein:
  the supporting unit comprises at least one supporting module,
  a first surface of the supporting module contacts the vibration unit,
  a second surface of the supporting module, opposite to the first surface, contacts the casing unit.

5. The head-mounted electronic device according to claim 4, wherein:
  the vibration unit is strip-shaped, the supporting module is provided at an end of the strip, so that there is gap between at least the middle part of the vibration unit and the casing unit; or
  the supporting module is provided corresponding to surface of the vibration unit, which contacts the supporting module.

6. The head-mounted electronic device according to claim 4, wherein:
  the supporting module is provided on a surface of the vibration unit; or
  the supporting unit includes at least two supporting modules, and the supporting modules are provided separately on the opposite surfaces of the vibration unit.

7. The head-mounted electronic device according to claim 1, wherein the processing unit is provided in the first retaining part and/or the second retaining part, so that a first distance between the geometric center of the head-mounted electronic device and the plane of the lens part is less than a second distance between the gravity center of head-mounted electronic device and the plane of the lens part.

8. A bone conduction unit, comprising:
  a casing unit, inside which space for accommodation is formed;
  a signal transmission unit, configured to receive audio signals;
  a vibration unit, provided in the casing unit, comprising:
    a metal substrate, connected to the signal transmission unit, and
    a piezoelectric plate, provided correspondingly to the metal substrate,
  wherein a predetermined electric field is formed inside the piezoelectric plate by a pre-polarization process,
  when the first audio signal is applied to the metal substrate, the piezoelectric plate and the metal substrate are bent by the force of the first audio signal so as to vibrate according to the first audio signal;
  a supporting unit, provided in the casing unit and configured to support the vibration unit so as to ensure that the vibration unit does not contact the casing unit so that the vibration unit can vibrate in the space for accommodation inside the casing unit, and configured to transmit the vibrations generated by the vibration unit to the casing unit.

* * * * *